Aug. 28, 1956　　　F. C. MELCHIOR　　　2,760,260
METHOD OF ROLLING CAPSULES
Filed Dec. 17, 1952　　　　　　　　　　　3 Sheets-Sheet 1
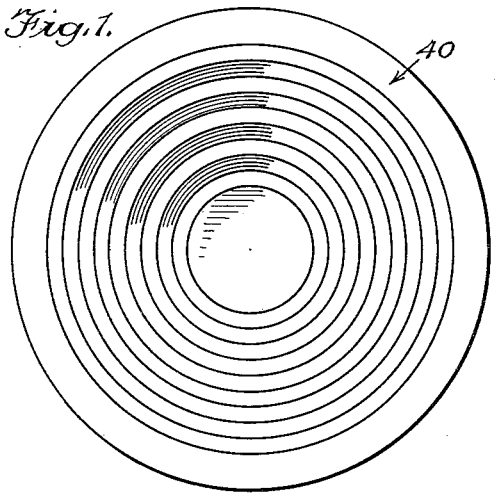
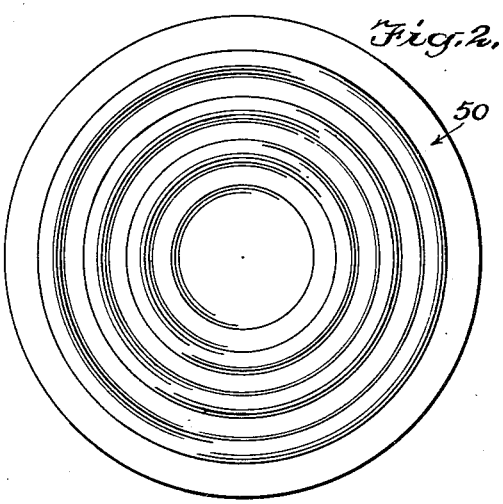
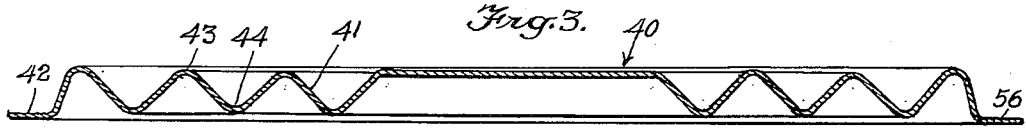
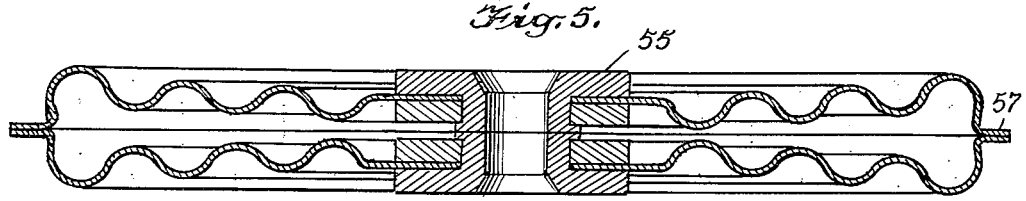
INVENTOR.
Frederick C. Melchior
BY
John H. Glaccum
Attorney

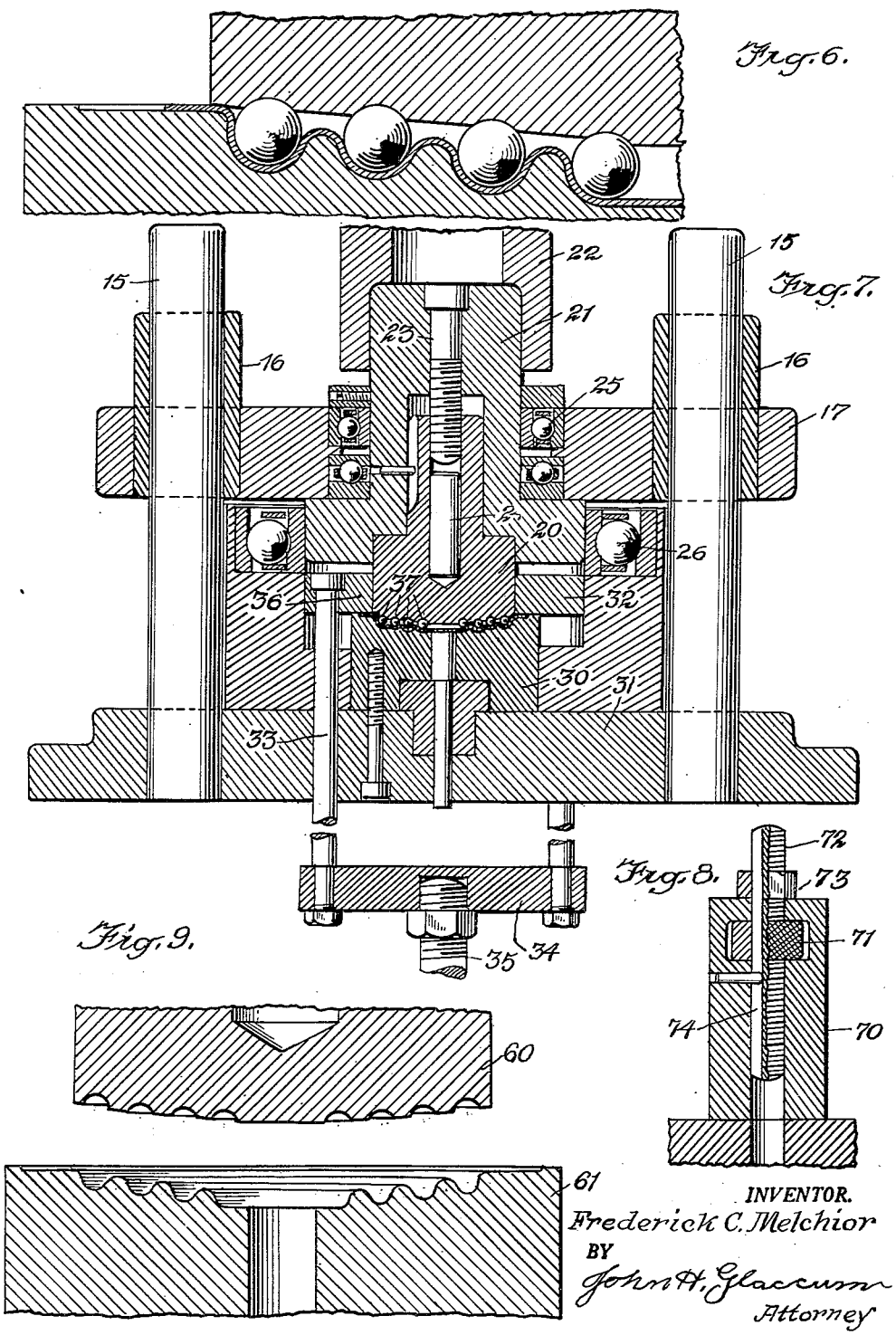

Aug. 28, 1956　　　F. C. MELCHIOR　　　2,760,260
METHOD OF ROLLING CAPSULES

Filed Dec. 17, 1952　　　　　　　　　　　3 Sheets-Sheet 3

INVENTOR.
Frederick C. Melchior
BY
John H. Glaccum
Attorney

United States Patent Office 2,760,260
Patented Aug. 28, 1956

2,760,260
METHOD OF ROLLING CAPSULES
Frederick C. Melchior, New York, N. Y.
Application December 17, 1952, Serial No. 326,521
3 Claims. (Cl. 29—454)

This invention relates to pressure instruments, and more particularly to the pressure sensing elements in such instruments where, in response to pressure variations, they produce motion for indication, recording and control of values. More specifically, the invention relates to the type of pressure sensitive element frequently referred to as a "Capsule"—a gas-tight, circular shaped container—most properly called "Diaphragm Capsule," as it is composed of two concentrically corrugated diaphragms assembled together at their flanges or peripheries by means of soldering or welding.

While there also exist other types of pressure sensing elements, such as the "Bellows" which is formed from a thin-walled metal cylinder in which have been spun a plurality of annular corrugations, and the "Bourdon tube" which most commonly is in the nature of a flattened tube bent into the shape of a curve such as a helix, the diaphragm capsule has conclusively proved to be the most satisfactory from the standpoint of performance and stability. Not only does it have superior accuracy because of inherently lower hysteresis (spring lay), but it is also less affected by temperature, gravitation and acceleration forces.

Considering that, in the case of capsules, the latter three factors can be offset, controlled or compensated for hysteresis then becomes the major factor affecting accuracy as expressed by the element's ability to precisely repeat indication of pressure values anywhere on the scale range.

Inasmuch as the capsule diaphragms function as springs, it is obvious that the first requisite is a good springy material. Secondly, such spring material must be properly formed, preferably work-hardened as much as possible in the process, and heat treated for optimum properties. In this connection it should be noted that good spring materials are especially susceptible to work-hardening which occurs from the reduction in thickness inherent in the forming process. In order to obtain maximum work-hardening for best spring properties, it is also desirable to start with stock that has already been cold-worked in advance to the greatest degree of hardness that can be coped with in the forming operation; however, in the conventional, straight drawing operation, forming the diaphragms under high pressure in discs with grooves and lands of suitable design, this possibility is very limited, as the advance hardness of the stock will cause it to crack from the strain imposed on it by stretching.

With this method it is also practically impossible to obtain true radii and desired uniformity of corrugations. The characteristics of the grain structure, as affected by the cold working process, is another factor that will be treated of hereinafter.

One object of the invention is to provide ways and means for obtaining the greatest practicable amount of cold work in the finished diaphragm for best spring properties.

Perhaps one of the most important objects of the invention is to provide a method of manufacturing diaphragms whereby the concentric shear stresses are eliminated by means of forming annular blanks with drawing dies and then simultaneously subjecting the blanks to a rolling process in which balls under pressure are rolled in the grooves to produce a diaphragm of the design desired.

Another object of the invention is to provide for corrugations of true radii and uniformity of depth and residual thickness of material in the grooves.

Another object of this invention is to make possible optimum depth of corrugations together with maximum practicable amount of cold work (work hardening) for desired stiffness and best spring properties.

A further object of the invention is to obtain best possible uniformity of residual material thickness, with true radii in the corrugations, for optimum uniformity of bending stresses in the deflection of the diaphragms, and consequent linearity of capsule motion.

A still further object of the invention is to provide for a uniform grain structure concentric about the center of the diaphragm so as to substantially eliminate shear stresses—and thereby hysteresis—in addition to obtaining greatest possible uniformity of bending stresses.

It is also an object of this invention to provide a method and a process whereby diaphragm capsules may be produced in series with consistent uniformity of performance commensurate with the requirements of each particular application and pressure range.

Additional objects of this invention, and the advantages derived therefrom, will be more readily understood from the accompanying drawings together with the detail description contained in the ensuing specification.

Referring to the drawings—

Fig. 1 is a plan view of a portion of a capsule in one stage of production.

Fig. 2 is a plan view of a portion of the capsule in a further stage of production.

Fig. 3 is an enlarged cross-sectional view of the diaphragm shown in Fig. 1.

Fig. 4 is a view similar to Fig. 3 of the capsule shown in Fig. 2.

Fig. 5 is a cross-sectional view of the finished capsule made in accordance with my method.

Fig. 6 is an enlarged sectional view of a die used in a portion of my method.

Fig. 7 is a sectional view of apparatus for carrying out one step of my method.

Fig. 8 is a cross-sectional view of a micrometer stop limiting the action of the machine.

Fig. 9 is a cross-sectional view of the die for manufacturing barometer capsules.

The capsules manufactured by the present invention are of a type used in very sensitive manometers, barometers and differential pressure instruments similar to that shown in my Patent No. 2,603,728, issued July 15, 1952, wherein the capsule must be extremely sensitive and the instrument must be of an accuracy as one part in 10,000.

To prepare my capsule the disks of metal are preformed with a conventional drawing method which produces a diaphragm similar to that shown in Figs. 1 and 3. Blanks are cut out with a special blanking tool to a predetermined diameter. Shoulders are formed in a special shoulder die raising the central area slightly above the flange. Corrugations are located and positively formed in a set of straight conventional dies, the lands of which have a common plane for a tangent and, therefore, do not impart either concave or convex radii to the diaphragm.

The blanks are then ready for the rolling process. The rolling is done with steel balls in solid steel dies of exactly the same design as is desired in the finished diaphragms and with grooves having the same radii as the balls plus the residual finished product.

Figure 11:
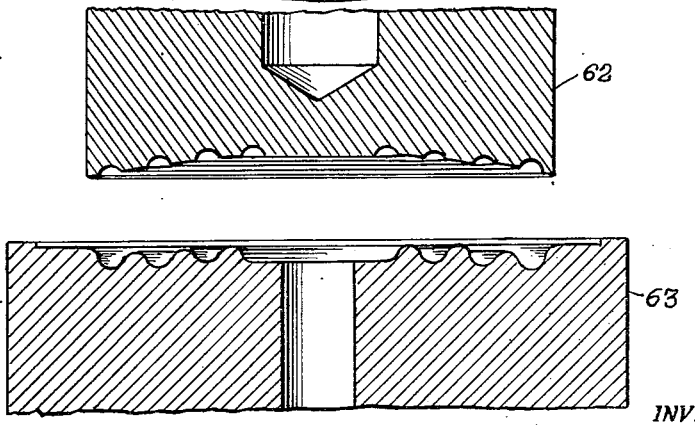
Fig. 11 is a cross-sectional view of a die for manufacturing differential capsules.

In order to accomplish this I use the dies shown in Figs. 9 and 11 in a drill press or miller together with an appropriate fixture such as is shown in Fig. 7. I provide a plurality of shafts 15 upon which a suitable bushing 16 is mounted in the press carriage 17. The female portion of the die 20 is mounted in a suitable tool holder 21, which is engaged by the chuck 22 of the press. This may be mounted by means of the bolt 23 and may include a magnet 24 in order to attract the steel balls. Suitable bearings 25 and 26 are provided to insure smooth operation.

The male portion of the die 30 is mounted in the bed 31. A clamping member 32 is mounted on shafts 33 controlled by the bar 34 with an air cylinder attached 35. When the bar 34 is raised the partly finished diaphragm 40, which has been provided with corrugations 41, and a shoulder or flange 42, may be placed in the machine. It will be seen from Fig. 3 that the blank 40 at this point has lands 43 and grooves 44 of the more or less angular configuration. The clamping jaws 36 and the clamping member 32 are then brought down by air or hydraulic pressure upon the shoulders 42 of the blank to hold it firmly in place, and the press carrying the female die with the steel balls 37 is brought down upon the blank and rotated.

The reduction in thickness obtained in this process is synonymous with added cold work and varies from about 15 to 25 per cent. This produces the diaphragm 50 similar to that shown in Figs. 2 and 4 wherein the corrugations 51 have true radii and optimum uniformity of thickness. The diaphragms are then punched in the concentric hole of predetermined diameter, and the center buttons or hubs 55 (see Fig. 5) are welded to a pair of matched diaphragms. The flanges 56 are then welded together to form a single flange 57, preferably by overlapping spot welds to form the complete capsule.

In Figs. 9 and 11 the dies 60 and 61 form a concave diaphragm while the dies in Fig. 11, 62 and 63 form a convex diaphragm, the latter being for the manufacture of differential capsules and the former for barometer capsules.

Figure 10:
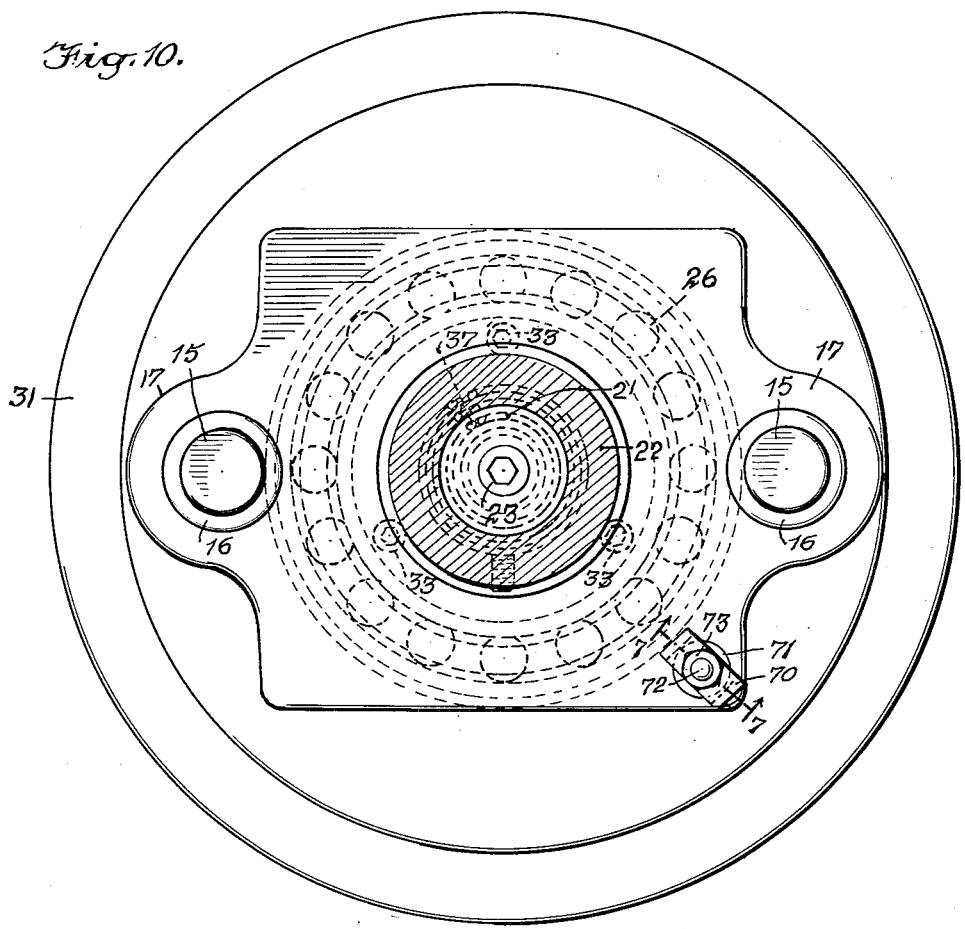
Fig. 10 is a top plan view of an operation of the die.

In order that the downward travel of the pressure carriage 17 may be accurately controlled I provide a micrometer stop as shown in Figs. 8 and 10. This comprises the post 170, the micrometer screws 72, the knurl nut 71, the locking nut 73, and a spline screw 74. This may be set so as to definitely control the thickness to which the diaphragm will be rolled.

I claim:

1. A method of manufacturing pressure sensitive capsules which includes forming annular blanks with conventional drawing dies, simultaneously subjecting both sides of said blanks to the rolling action of ball bearings in a rotating die whereby the concentric shear stresses are eliminated and welding a pair of said diaphragms together.

2. A method of manufacturing pressure sensitive capsules which includes forming annular blanks with conventional drawing dies, simultaneously subjecting both sides of said blanks to the rolling action of ball bearings in a rotating die whereby the concentric shear stresses are eliminated and welding a pair of said diaphragms together after a central button has been attached to each of said diaphragms.

3. A method of manufacturing corrugated diaphragms for use in pressure sensing instruments comprising a first step of forming circular blanks with comparatively shallow concentric grooves and lands for the purpose of locating consecutive tracks for balls, the grooves being pressed down only to a limited degree of the final depth and subjecting said preformed blanks to a rolling process in which the balls under the action of pressure are rolled in the grooves to produce a diaphragm of the exact design desired in the finished diaphragm.

References Cited in the file of this patent

UNITED STATES PATENTS

| Number | Name | Date |
|---|---|---|
| 756,404 | Polte | Apr. 5, 1904 |
| 1,058,856 | Gibbs | Apr. 15, 1913 |
| 1,629,538 | Rode | May 24, 1927 |
| 1,786,506 | Ray | Dec. 30, 1930 |
| 1,806,009 | Whitacre | May 19, 1931 |
| 2,027,018 | Brinkman | Jan. 7, 1936 |
| 2,071,583 | Schutt | Feb. 23, 1937 |
| 2,150,771 | Kollsman | Mar. 14, 1939 |
| 2,162,308 | Jenny | June 13, 1939 |
| 2,223,799 | Annen | Dec. 3, 1940 |
| 2,411,874 | Golden | Dec. 3, 1946 |
| 2,534,123 | Hasselhorn | Dec. 12, 1950 |

FOREIGN PATENTS

| Number | Country | Date |
|---|---|---|
| 474,035 | Germany | Mar. 25, 1929 |